US006925789B2

(12) United States Patent
Lin

(10) Patent No.: US 6,925,789 B2
(45) Date of Patent: Aug. 9, 2005

(54) CUTTING APPARATUS FOR A LAWN MOWER

(75) Inventor: Paul Lin, Yung-Kang (TW)

(73) Assignee: Macauto Industrial Co., Ltd., Yung-Kang (TW)

( * ) Notice: Subject to any disclaimer, the term of this patent is extended or adjusted under 35 U.S.C. 154(b) by 32 days.

(21) Appl. No.: 10/751,519

(22) Filed: Jan. 6, 2004

(65) Prior Publication Data

US 2005/0144920 A1 Jul. 7, 2005

(51) Int. Cl.[7] .............................................. A01D 34/00
(52) U.S. Cl. ...................................................... 56/12.7
(58) Field of Search ........................ 56/12.7, 295, 16.7, 56/17.5, 17.2, 12.1, 16.9, 255; 30/276, 347

(56) References Cited

U.S. PATENT DOCUMENTS 5,048,278 A * 9/1991 Jones et al. .................... 56/295
5,433,006 A * 7/1995 Taguchi ........................ 30/276
5,649,413 A * 7/1997 Oostendorp ................. 56/12.7
6,035,618 A * 3/2000 Fogle .......................... 56/12.7
6,427,341 B1 * 8/2002 Lee ............................. 30/347
2002/0157368 A1 * 10/2002 Scott et al. .................. 56/12.7

* cited by examiner

*Primary Examiner*—Árpád Fábián Kovács
(74) *Attorney, Agent, or Firm*—Lowe, Hauptman & Berner, LLP

(57) ABSTRACT

A cutting apparatus for a lawn mower includes a base plate that has a side surface which is formed with two guiding blocks and an abutment post. The abutment post is disposed between the guiding blocks. A nylon line has two block-engaging line portions received respectively within slots in the guiding blocks, a curved post-engaging line portion abutting against an annular surface of the post, and two generally straight connecting line portions connecting the block-engaging line portions respectively to the post-engaging line portion. One of the block-engaging line portions forms an acute angle with an adjacent one of the connecting line portions so as to prevent the nylon line from being removed from the guiding blocks by the centrifugal force of the nylon line when the base plate rotates.

6 Claims, 6 Drawing Sheets

CUTTING APPARATUS FOR A LAWN MOWER

BACKGROUND OF THE INVENTION

1. Field of the Invention

This invention relates to a lawn mower, and more particularly to a cutting apparatus for a lawn mower.

2. Description of the Related Art

Referring to FIGS. 1 and 2, a conventional cutting apparatus 1 for a nylon line type lawn mower is shown to include a line-mounting seat 11, a line-guiding seat 12, and a nylon line 13. The line-mounting seat 11 is connected fixedly to a lower end of a rotating shaft 10, and includes a surrounding wall ill, a top wall 112 having an outer periphery that is formed integrally with an upper end of the surrounding wall 111, an outward flange 114 extending radially and outwardly from the surrounding wall 111, two small-diameter line inlets 115, two large-diameter line inlets 116 disposed at the same level as the small-diameter line inlets 115, and two line outlets 117 disposed above the small-diameter line inlets 115 and the large-diameter line inlets 116.

The line-guiding seat 12 is connected rotatably to and is locked releasably on the line-mounting seat 11, and includes a bottom wall 121, and a guiding wall 122 extending upwardly from the bottom wall 121. The guiding wall 122 has a positioning portion 123, and two guiding slots 124 that are disposed at two opposite sides of the positioning portion 123. Each of the guiding slots 124 has an inner end 125 proximate to the positioning portion 123, and an outer end 126 distal from the positioning portion 123 and disposed above the inner end 125. When the line-guiding seat 12 is released from and is rotated on the line-mounting seat 11 so as to locate the positioning portion 123 of the line-mounting seat 11 between the small-diameter line inlets 115 or the large-diameter line inlets 116 of the line-mounting seat 11 in accordance with the diameter of the nylon line 13, two ends of the nylon line 13 can be inserted into the small-diameter line inlets 115 or the large-diameter line inlets 116. The ends of the nylon line 13 will enter into the inner ends 125 of the guiding slots 124 in the line-guiding seat 12 so as to move to the outer ends 126 of the guiding slots 124, thereby projecting respectively from the line outlets 117 in the line-mounting seat 11. Although the height difference between the inner and outer ends 125, 126 of the guiding slots 124 can prevent the nylon line 13 from being removed from the line-mounting seat 11 and the line-guiding seat 12 by the centrifugal force of the nylon line 13 during the cutting operation of the cutting apparatus 1, the height of the line-mounting seat 11 is relatively large, thereby increasing the volume of the cutting apparatus 1. Furthermore, it is difficult to move the nylon line 13 smoothly from the small-diameter line inlets 115 or the large-diameter line inlets 116 in the line-mounting seat 11 into the line outlets 117 through the guiding slots 124 in the line-guiding seat 12.

SUMMARY OF THE INVENTION

An object of this invention is to provide a compact cutting apparatus for a lawn mower. Another object of this invention is to provide a cutting apparatus for a lawn mower, which includes two guiding blocks with straight slots extending along a plane so that a nylon line can be inserted easily therethrough. According to this invention, a cutting apparatus for a lawn mower includes a base plate that has a side surface which is formed with two guiding blocks and an abutment post. The abutment post is disposed between the guiding blocks. A nylon line has two block-engaging line portions received respectively within slots in the guiding blocks, a curved post-engaging line portion abutting against an annular surface of the post, and two generally straight connecting line portions connecting the block-engaging line portions respectively to the post-engaging line portion. One of the block-engaging line portions forms an acute angle with an adjacent one of the connecting line portions so as to prevent the nylon line from being removed from the guiding blocks by the centrifugal force of the nylon line when the base plate rotates.

Preferably, the line-receiving slots in the guiding blocks are straight, and are parallel to each other. Imaginary extension lines of the line-receiving slots in the guiding blocks are located at two opposite sides of a rotating axis of the base plate. As such, the nylon line can be inserted easily through the line-receiving slots in the guiding blocks during assembly.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
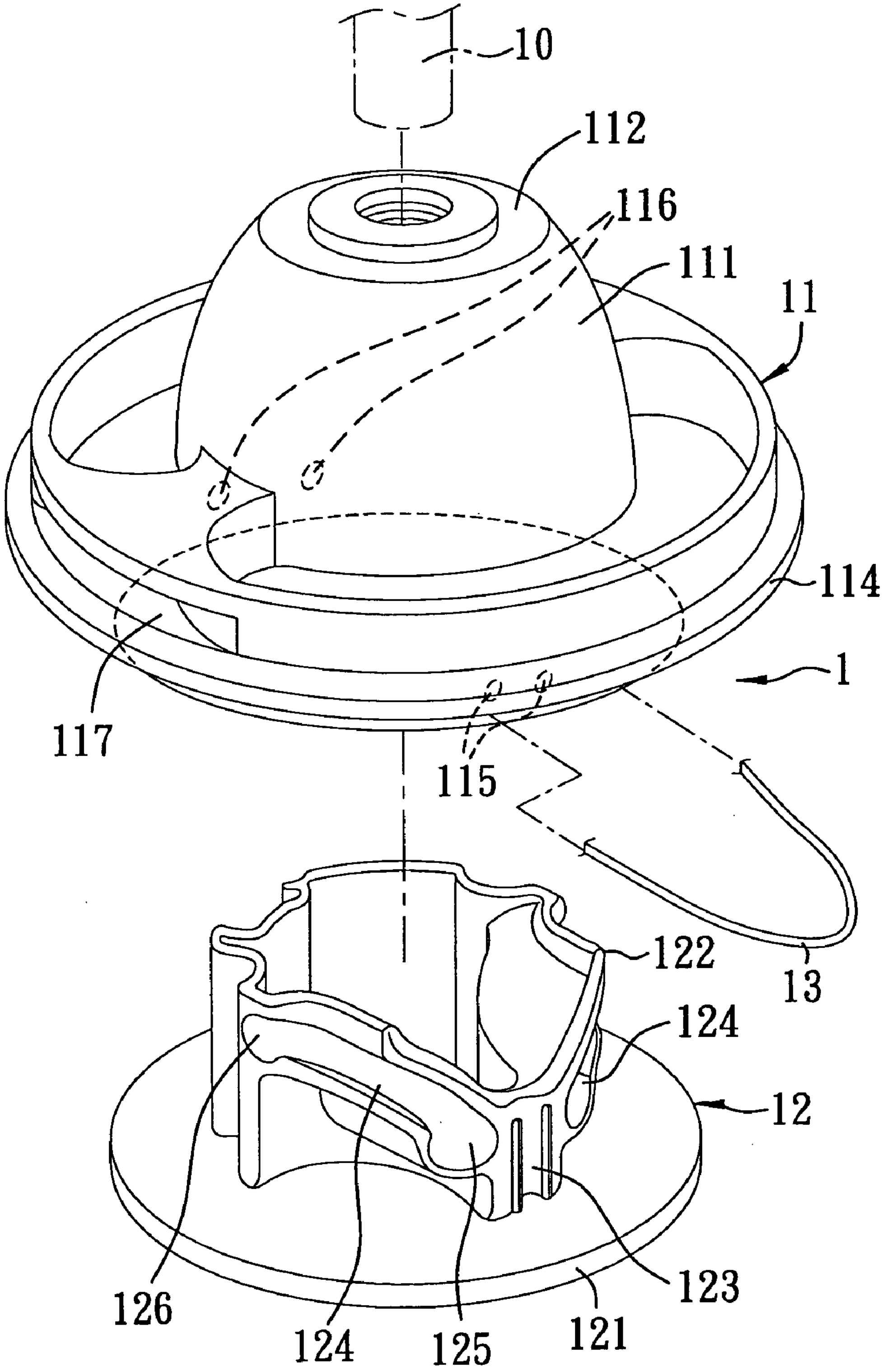
FIG. 1 is an exploded perspective view of a conventional cutting apparatus for a nylon line type lawn mower.
Figure 2:
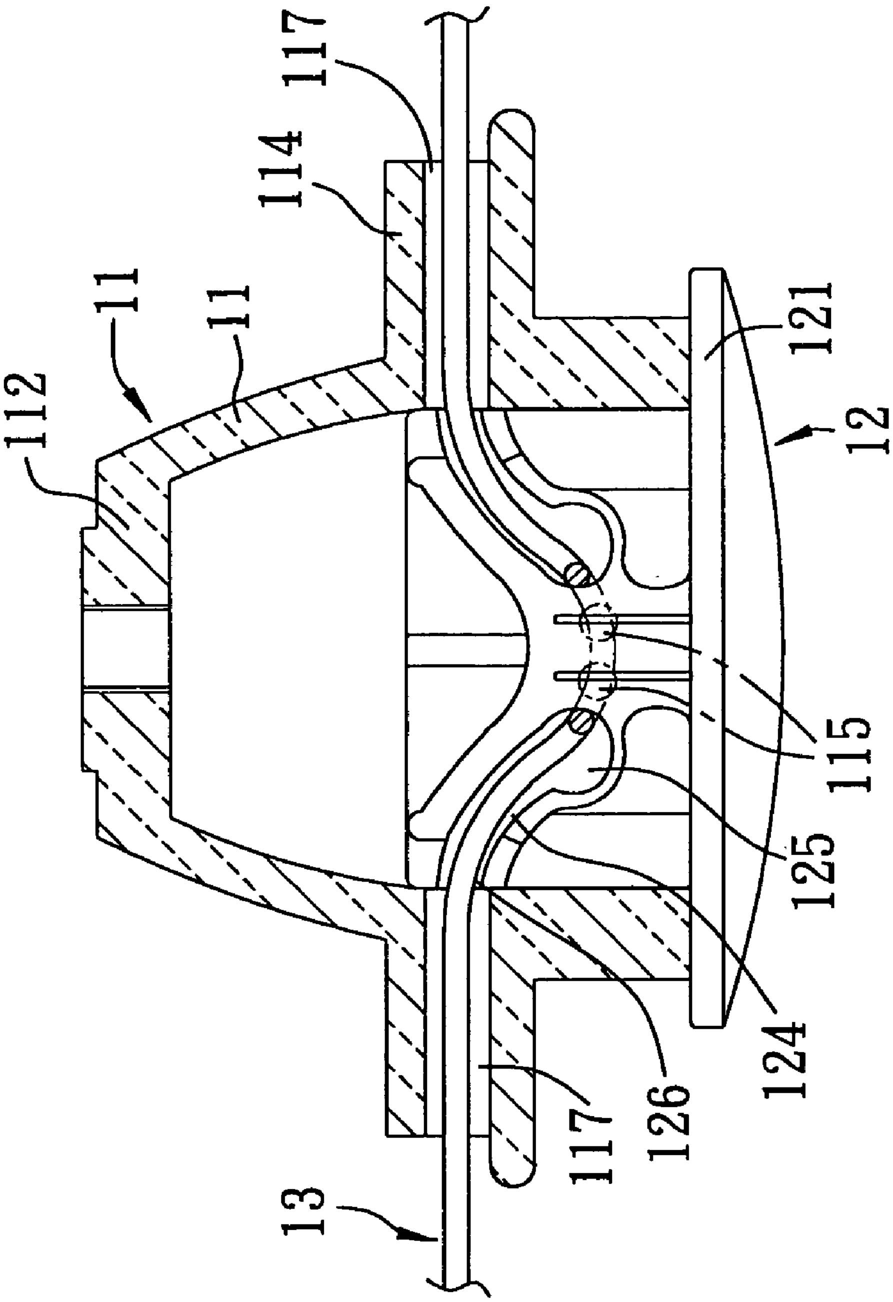
FIG. 2 is a sectional view of the conventional cutting apparatus.
Figure 3:
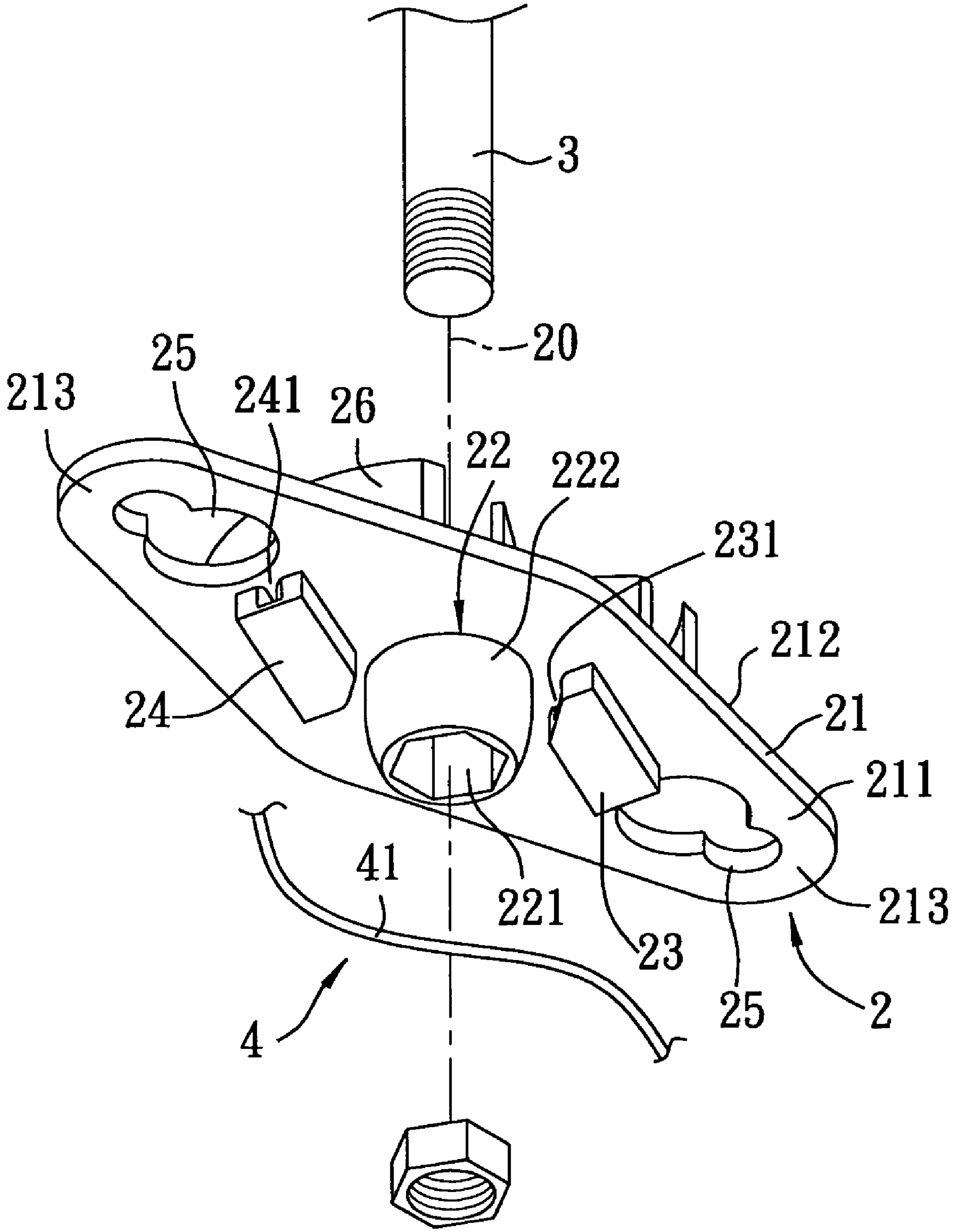
FIG. 3 is a perspective view of the preferred embodiment of a cutting apparatus for a lawn mower according to this invention, a blade assembly being removed for the sake of brevity.
Figure 4:
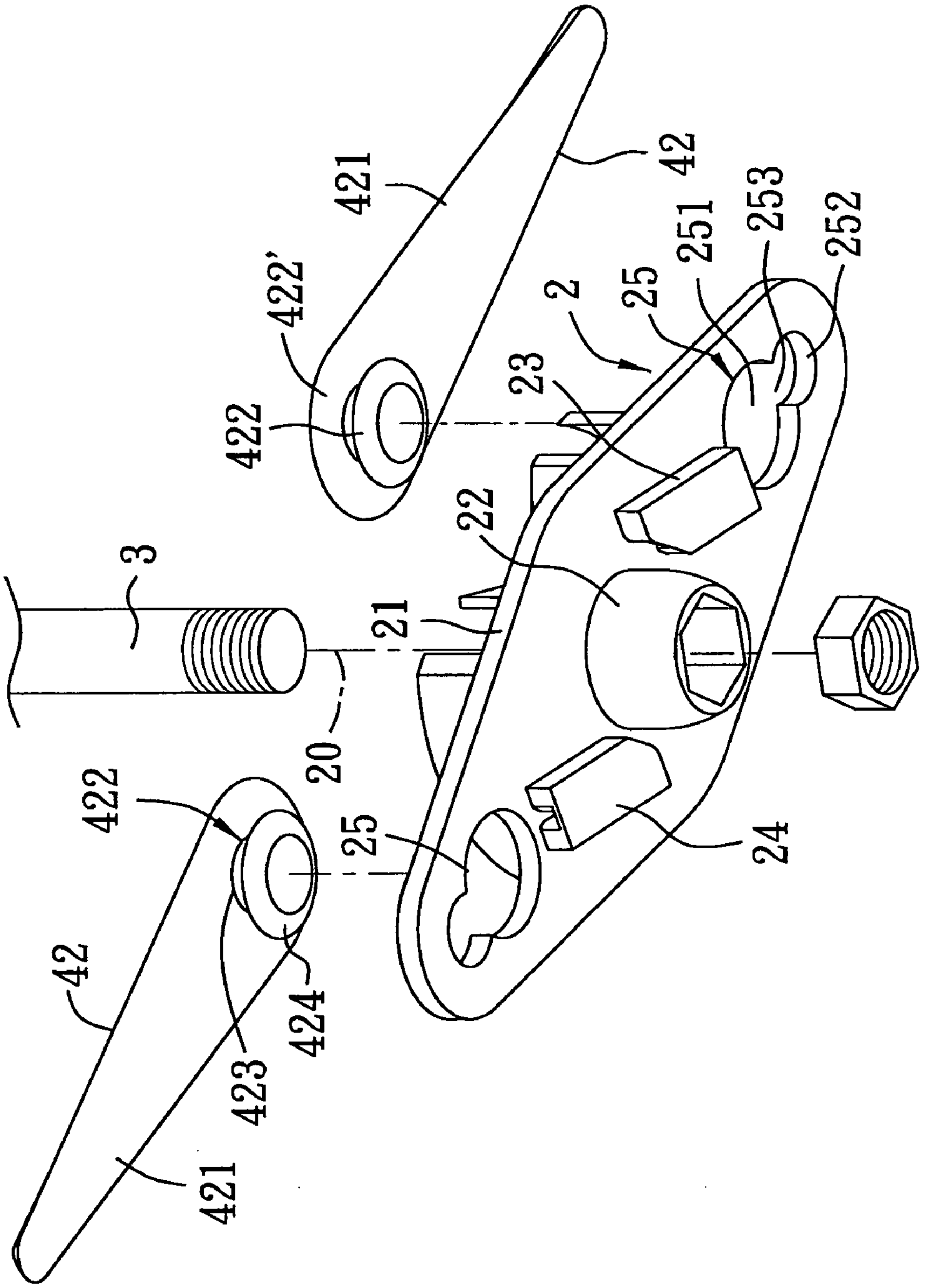
FIG. 4 is a perspective view of the preferred embodiment, a nylon line being removed for the sake of brevity.
Figure 5:
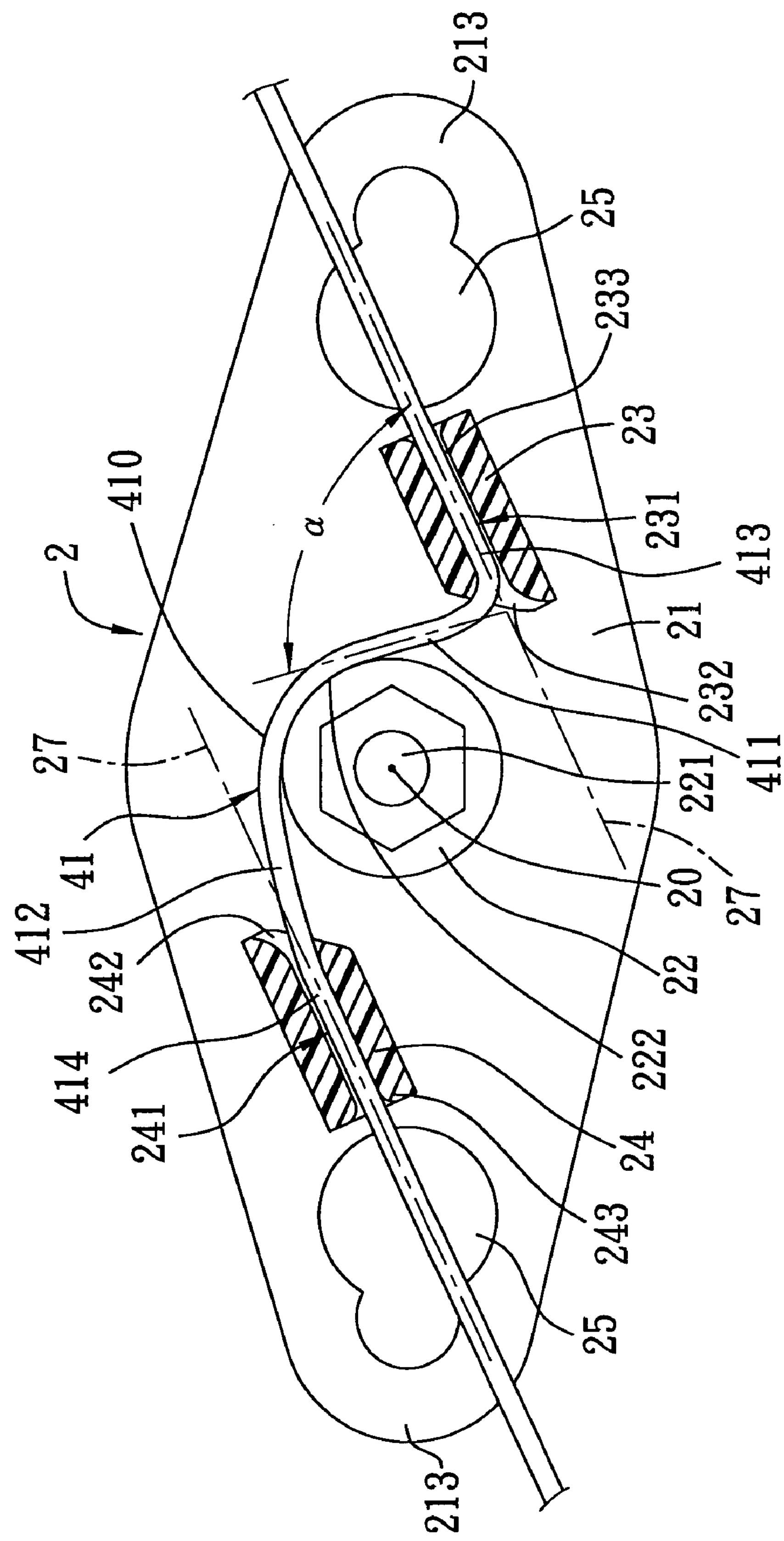
FIG. 5 is a partly sectional top view of the preferred embodiment, the blade assembly being removed for the sake of brevity.
Figure 6:
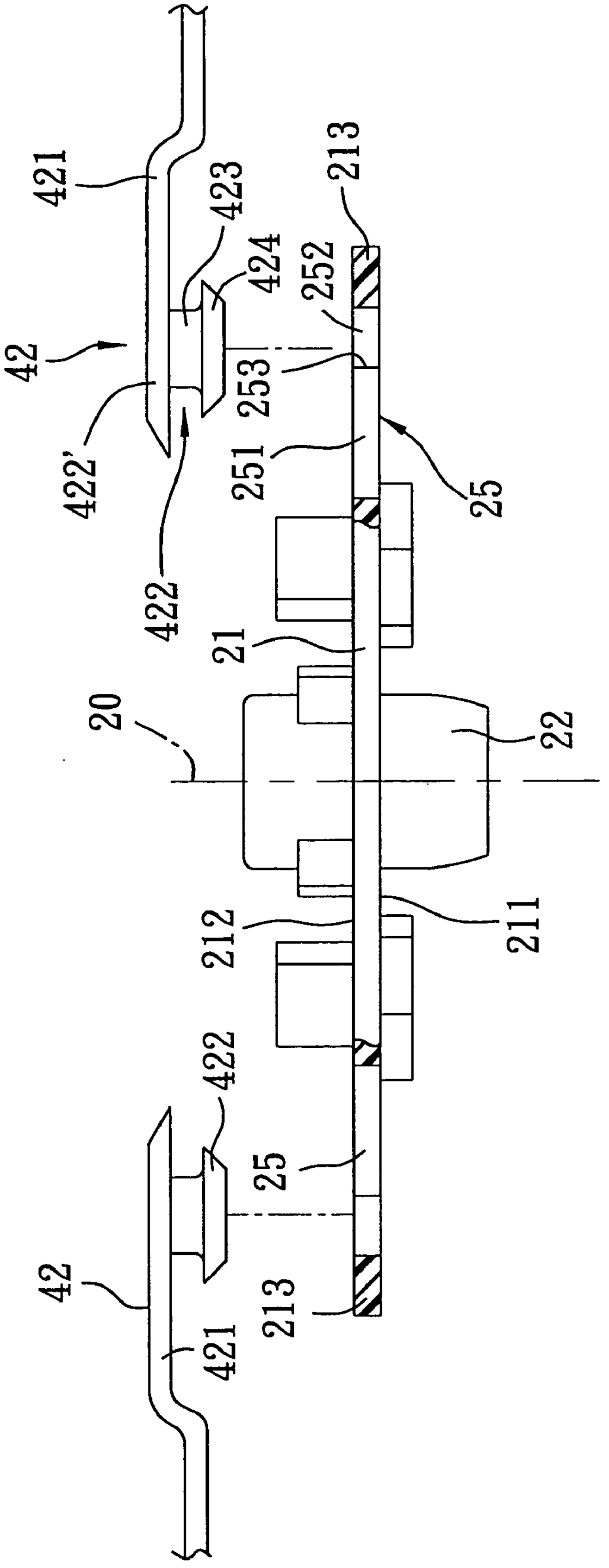
FIG. 6 is a partly sectional side view of the preferred embodiment, the nylon line being removed for the sake of brevity.

Referring to FIGS. 3, 4, 5, and 6, the preferred embodiment of a cutting apparatus for a lawn mower is shown to include a unitary mounting seat 2 made of a plastic material and connected fixedly to a lower end of a vertical rotating shaft 3, and a cutting unit 4 consisting of a nylon line 41 (see FIGS. 3 and 5) and a blade assembly that has two blade members 42 (see FIGS. 4 and 6).

The mounting seat 2 includes a base plate 21, an abutment post 22, a first guiding block 23, a second guiding block 24, two blade-retaining holes 25, and a plurality of reinforcing ribs 26. The base plate 21 is horizontal and elongated, is connected fixedly to the rotating shaft 3, is rotatable about a rotating axis 20, and has a planar bottom side surface 211, a top side surface 212, and two opposite ends 213. The abutment post 22 is hollow, extends integrally and downwardly from the bottom side surface 211 of the base plate 21, and is formed with a central hole 221 and an annular surface 222 that are coaxial with the rotating axis 20 of the base plate 21. The reinforcing ribs 26 extend integrally and upwardly from the top side surface 212 of the base plate 21.

The first and second guiding blocks 23, 24 extend integrally and downwardly from the bottom side surface 211 of the base plate 21, and are located at two opposite sides of the abutment post 22. Each of the first and second guiding blocks 23, 24 is formed with a line-receiving slot 231, 241 therethrough that has an inner end 232, 242 proximate to the abutment post 22, and an outer end 233, 243 distal from the abutment post 22. The line-receiving slots 231, 241 in the first and second guiding blocks 23, 24 are coplanar and straight, and are parallel to each other. The rotating axis 20 of the base plate 21 is located between imaginary extension lines 27 of the line-receiving slots 231, 241 in the first and second guiding blocks 23, 24.

The nylon line 41 extends through the line-receiving slots 231, 241 in the first and second guiding blocks 23, 24, and has a curved post-engaging line portion 410, a generally straight first connecting line portion 411, a generally straight second connecting line portion 412, a straight first block-engaging line portion 413, and a straight second block-engaging line portion 414. The post-engaging line portion 410 abuts against the annular surface 222 of the abutment post 22. The first and second block-engaging line portions 413, 414 are received respectively within the line-receiving slots 231, 241 in the first and second guiding blocks 23, 24. The first connecting line portion 411 interconnects the post-engaging line portion 410 and the first block-engaging line portion 413. An acute angle $\alpha$ is formed between the first connecting line portion 411 and the first block-engaging line portion 413, thereby preventing the nylon line 41 from being removed from the first and second guiding blocks 23, 24 by the centrifugal force of the nylon line 41 when the rotating shaft 3 rotates. The second connecting line portion 412 interconnects the post-engaging line portion 410 and the second block-engaging line portion 414. An obtuse angle is formed between the second connecting line portion 412 and the second block-engaging line portion 414. Alternatively, an acute angle is formed between the second connecting line portion 412 and the second block-engaging line portion 414.

The blade-retaining holes 25 are formed respectively through two ends 213 of the base plate 21 such that the first and second guiding blocks 23, 24 are disposed between the blade-retaining holes 25. Each of the blade-retaining holes 25 is gourd-shaped, and has a radial inner end that is formed with a large-diameter hole portion 251, and a radial outer end that is formed with a small-diameter hole portion 252 which has a diameter smaller than that of the large-diameter hole portion 251 and which defines a neck portion 253 between the large-diameter hole portion 251 and the small-diameter hole portion 252.

Each of the blade members 42 has a cutting blade portion 421 and a mounting blade portion 422 that are formed integrally with each other. The cutting blade portions 421 extend from the mounting blade portions 422 away from each other. The mounting blade portion 422 of each of the blade members 42 includes a blade body 422', a neck 423, and a head 424. The blade body 422' of each of the blade members 42 is sized to be prevented from moving through the large-diameter hole portion 251 and the small-diameter hole portion 252 of the corresponding blade-retaining hole 25 in the base plate 21. Each of the necks 423 and the heads 424 has a circular cross-section. Each of the heads 424 has a diameter which is smaller than that of the large-diameter hole portion 251 of the corresponding blade-retaining hole 25 in the base plate 21 and which is larger than that of the small-diameter hole portion 252 of the corresponding blade-retaining hole 25 in the base plate 21. As such, the heads 242 can move through the large-diameter hole portions 251, and cannot move through the small-diameter hole portions 252.

In the mounting blade portion 422 of each of the blade members 42, the neck 423 is disposed between and is formed integrally with the blade body 422' and the head 424, is received fittingly within the small-diameter hole portion 252, and has a diameter slightly larger than the width of the neck portion 253 of the blade-retaining hole 25 such that the neck 423 is movable forcibly between the small-diameter hole portion 252 and the large-diameter hole portion 251 through the neck portion 253. When the neck 423 is disposed within the large-diameter hole portion 251, the blade member 42 can be removed from the blade-retaining hole 25. As such, the mounting blade portions 422 of the blade members 42 can be mounted respectively and detachably within the blade-retaining holes 25 in the base plate 21.

During use, the nylon line 41 or the blade members 42 can be mounted to the base plate 21 for performing the grass-cutting operation.

With this invention thus explained, it is apparent that numerous modifications and variations can be made without departing from the scope and spirit of this invention. It is therefore intended that this invention be limited only as indicated by the appended claims.

I claim:

1. A cutting apparatus for a lawn mower, the lawn mower including a vertical rotating shaft, said cutting apparatus comprising:

a base plate adapted to be connected fixedly to the rotating shaft and having a side surface and a rotating axis, said base plate being elongated and having two blade-retaining holes formed respectively through two ends of said base plate;

an abutment post extending integrally from said side surface of said base plate and formed with an annular surface coaxial with said rotating axis of said base plate;

a pair of first and second guiding blocks extending integrally from said side surface of said base plate and located at two opposite sides of said abutment post, each of said first and second guiding blocks being formed with a line-receiving slot therethrough that has an inner end proximate to said abutment post, and an outer end distal from said abutment post, said line-receiving slots in said first and second guiding blocks being coplanar, said line-receiving slots in said first and second guiding blocks being straight and parallel to each other, said rotating axis of said base plate being located between imaginary extension lines of said line-receiving slots in said first and second guiding blocks, said first and second guiding blocks being disposed between said blade-retaining holes in said base plate; and a cutting unit including:

a nylon line that extends through said line-receiving slots in said first and second guiding blocks and that has a pair of first and second block-engaging line portions received respectively within said line-receiving slots in said first and second guiding blocks, a curved post-engaging line portion abutting against said annular surface of said abutment post, a generally straight first connecting line portion interconnecting said first block-engaging line portion and said post-engaging line portion so as to form an acute angle between said first block-engaging line portion and said first connecting line portion, thereby preventing said nylon line from being removed from said first and second guiding blocks by centrifugal force of said nylon line when the rotating shaft rotates, a generally straight second connecting line portion interconnecting said second block-engaging line portion and said post-engaging line portion, and a blade assembly having two blade members, each of which has a cutting blade portion and a mounting blade portion that are interconnected fixedly, said mounting blade portions of said blade members being mounted respectively and detachably within said blade-retaining holes in said base plate, said cutting blade portions extending from said mounting blade portions away from each other, whereby one of said nylon line and said blade assembly of said cutting unit can be removed from said base plate during use.

2. The cutting apparatus as claimed in claim 1, wherein each of said blade-retaining holes in said base plate is gourd-shaped, and has a radial inner end that is formed with a large-diameter hole portion, and a radial outer end that is formed with a small-diameter hole portion which has a diameter smaller than that of said large-diameter hole portion and which defines a neck portion between said large-diameter hole portion and said small-diameter hole portion, said mounting blade portion of each of said blade members including:

a blade body sized to be prevented from moving through said large-diameter hole portion and said small-diameter hole portion of a corresponding one of said blade-retaining holes in said base plate, a head sized to be prevented from moving through said small-diameter hole portion of the corresponding one of said blade-retaining holes in said base plate and to be permitted to move through said large-diameter hole portion of the corresponding one of said blade-retaining holes in said base plate, and a neck disposed between and formed integrally with said blade body and said head, said neck being received fittingly within said small-diameter hole portion of the corresponding one of said blade-retaining holes in said base plate and being movable from said small-diameter hole portion of the corresponding one of said blade-retaining holes in said base plate into the small-diameter hole portion of the corresponding one of said blade-retaining holes in said base plate through said neck portion of the corresponding one of said blade-retaining holes in said base plate so as to permit removal of a corresponding one of said blade members from said base plate.

3. The cutting apparatus as claimed in claim 2, wherein said base plate is made of a plastic material, each of said head and said neck of said mounting blade portion of each of said blade members having a circular cross-section, said neck portion of each of said blade-retaining holes in said base plate having a width that is slightly smaller than diameter of said neck of a corresponding one of said mounting blade portions of said blade members such that said neck of the corresponding one of said mounting blade portions of said blade members is movable forcibly through said neck portion of the corresponding one of said blade-retaining holes in said base plate.

4. A cutting apparatus for a lawn mower, the lawn mower including a vertical rotating shaft, said cutting apparatus comprising:

a base plate adapted to be connected fixedly to the rotating shaft and having a side surface and a rotating axis;

an abutment post extending integrally from said side surface of said base plate and formed with an annular surface coaxial with said rotating axis of said base plate;

a pair of first and second guiding blocks extending integrally from said side surface of said base plate and located at two opposite sides of said abutment post, each of said first and second guiding blocks being formed with a line-receiving slot therethrough that has an inner end proximate to said abutment post, and an outer end distal from said abutment post, said line-receiving slots in said first and second guiding blocks being coplanar; and a cutting unit including a nylon line that extends through said line-receiving slots in said first and second guiding blocks and that has a pair of first and second block-engaging line portions received respectively within said line-receiving slots in said first and second guiding blocks, a curved post-engaging line portion abutting against said annular surface of said abutment post, a generally straight first connecting line portion interconnecting said first block-engaging line portion and said post-engaging line portion so as to form an acute angle between said first block-engaging line portion and said first connecting line portion, thereby preventing said nylon line from being removed from said first and second guiding blocks by centrifugal force of said nylon line when the rotating shaft rotates, and a generally straight second connecting line portion interconnecting said second block-engaging line portion and said post-engaging line portion, said base plate being elongated and having two blade-retaining holes that are formed respectively through two ends of said base plate, said first and second guiding blocks being disposed between said blade-retaining holes in said base plate, said cutting unit further including a blade assembly having two blade members, each of which has a cutting blade portion and a mounting blade portion that are interconnected fixedly, said mounting blade portions of said blade members being mounted respectively and detachably within said blade-retaining holes in said base plate, said cutting blade portions extending from said mounting blade portions away from each other, whereby one of said nylon line and said blade assembly of said cutting unit can be removed from said base plate during use.

5. The cutting apparatus as claimed in claim 4, wherein each of said blade-retaining holes in said base plate is gourd-shaped, and has a radial inner end that is formed with a large-diameter hole portion, and a radial outer end that is formed with a small-diameter hole portion which has a diameter smaller than that of said large-diameter hole portion and which defines a neck portion between said large-diameter hole portion and said small-diameter hole portion, said mounting blade portion of each of said blade members including:

a blade body sized to be prevented from moving through said large-diameter hole portion and said small-diameter hole portion of a corresponding one of said blade-retaining holes in said base plate, a head sized to be prevented from moving through said small-diameter hole portion of the corresponding one of said blade-retaining holes in said base plate and to be permitted to move through said large-diameter hole portion of the corresponding one of said blade-retaining holes in said base plate, and a neck disposed between and formed integrally with said blade body and said head, said neck being received fittingly within said small-diameter hole portion of the corresponding one of said blade-retaining holes in said base plate and being movable from said small-diameter hole portion of the corresponding one of said blade-retaining holes in said base plate into the small-diameter hole portion of the corresponding one of said blade-retaining holes in said base plate through said neck portion of the corresponding one of said blade-retaining holes in said base plate so as to permit removal of a corresponding one of said blade members from said base plate.

6. The cutting apparatus as claimed in claim 5, wherein said base plate is made of a plastic material, each of said head and said neck of said mounting blade portion of each of said blade members having a circular cross-section, said neck portion of each of said blade-retaining holes in said base plate having a width that is slightly smaller than diameter of said neck of a corresponding one of said mounting blade portions of said blade members such that said neck of the corresponding one of said mounting blade portions of said blade members is movable forcibly through said neck portion of the corresponding one of said blade-retaining holes in said base plate.

* * * * *